United States Patent [19]

Stouffer et al.

[11] Patent Number: 5,356,336

[45] Date of Patent: Oct. 18, 1994

[54] NOZZLE FOR DISCHARGING AIR AND METHOD

[75] Inventors: Ronald D. Stouffer, Silver Spring; Ernest W. Chesnutis, Jr.; Milan Kuklik, both of Columbia, all of Md.

[73] Assignee: Bowles Fluidics Corporation, Columbia, Md.

[21] Appl. No.: 87,368

[22] Filed: Jul. 8, 1993

Related U.S. Application Data

[63] Continuation-in-part of Ser. No. 853,236, Mar. 17, 1992, abandoned, and a continuation-in-part of Ser. No. 3,702, Jan. 13, 1993, Pat. No. 5,297,989.

[51] Int. Cl.⁵ ............................................. B60H 1/34
[52] U.S. Cl. ................................. 454/155; 454/305; 454/309
[58] Field of Search ............... 454/109, 152, 155, 284, 454/289, 293, 294, 296, 297, 304, 305, 309

[56] References Cited

U.S. PATENT DOCUMENTS

| | | |
|---|---|---|
| 3,200,734 | 8/1965 | Burns et al. |
| 3,356,006 | 12/1967 | Scott |
| 3,548,735 | 12/1970 | Sweeney |
| 4,556,172 | 12/1985 | Sugawara et al. ............... 454/305 X |
| 4,664,022 | 5/1987 | Oouenino |
| 4,669,370 | 6/1987 | Hildebrand et al. |
| 4,702,155 | 10/1987 | Hildebrand et al. |

FOREIGN PATENT DOCUMENTS

| | | | |
|---|---|---|---|
| 251307 | 1/1988 | European Pat. Off. ............ | 454/305 |
| 68034 | 5/1979 | Japan ................................. | 454/305 |
| 108323 | 8/1979 | Japan ................................. | 454/305 |
| 38347 | 2/1986 | Japan ................................. | 454/155 |
| 195235 | 8/1986 | Japan ................................. | 454/305 |
| 294844 | 12/1987 | Japan ................................. | 454/305 |

OTHER PUBLICATIONS

"Improved Ventilating Register", *Iron Age*, Aug. 23, 1988 p. 296.

*Primary Examiner*—Harold Joyce
*Attorney, Agent, or Firm*—Jim Zegeer

[57] ABSTRACT

An air discharge nozzle and method for vehicles having a grill (21') which has a high degree of visual opacity to enhance design aesthetics, low impedance to air flow so that the face velocity remains high, and which does not significantly affect directionality of the air as imparted to the air stream by an upstream control mechanism. The grill (21') is comprised of a monolayer of polygonal cells in an array of cells, each cell being bounded by planar walls having a depth "L" interstitial thickness "T" and a diameter or major dimension "D", wherein the interstitial depth L is short enough such that the planar walls do not act as vanes to significantly affect directionality of the air, the interstitial thickness T has a value such that the impedance to air flow is low, and the length to diameter ratio L/D is no greater than about 0.7 and no less than about 0.3, such that the relative visual opacity of the grill when viewed from any angle is high. The open cell area Ao must be at least about 76% of the available (total) area to obtain an acceptable 1800 ft/min face velocity at a blower pressure of 0.24 inches H₂O. The upstream directionality control mechanism includes a disc intruder (224).

The intruder member has axially projecting control shaft (35') which carries a spherical member (37') frictionally received in a spherical socket (38') such that the control shaft can easily be manually manipulated.

21 Claims, 6 Drawing Sheets

NOZZLE FOR DISCHARGING AIR AND METHOD

REFERENCE TO RELATED APPLICATIONS

This is a continuation-in-part of U.S. application Ser. No. 07/853,236, filed Mar. 17, 1992 now abandoned and a continuation-in-part of U.S. application Ser. No. 08/003,702, filed Jan. 13, 1993 U.S. Pat. No. 5,297,989.

BACKGROUND AND BRIEF DESCRIPTION OF THE INVENTION

This invention relates to a nozzle for discharging air from an air supply into an enclosed space, such as a room, or to a vehicle interior, having a control device for controlling deflection of air from the nozzle through a grill having a high degree of visual opacity to obscure elements behind the grill while maintaining a high face velocity and without significantly affecting or impairing deflection of the air stream as imparted thereto by the upstream intruder control member.

Current nozzle grills, as found in vehicles, for example, are very transparent visually in that large areas behind the grill can be seen at even large off-axis angles, up to 70 degrees. Many grills are thin perforated metal or plastic sheets which, while having relatively high visual opacity, cause a drop or loss in air stream face velocity. When the thickness (T) of the physical interstitial structure forming the grill is reduced, with a concurrent increase in the face velocity (e.g. reduction in losses), the visual opacity decreases and large areas behind the grill can be seen. When the physical thickness T of the interstitial material is made thin with vane-like depth L, the grill material interferes with the directionality imparted to the air stream by the upstream control device.

In Stouffer et al. U.S. Pat. No. 4,686,890 an air nozzle having an open frame plate intruder member is disclosed for controlling the directionality of air discharged from the nozzle. In Jackson U.S. Pat. No. 4,413,551, front plates and directionality control is achieved by relative lateral movements between the front and back plates and the only part of the grill which is visible is the front plate. A somewhat similar directionality control scheme is illustrated in Elfverson U.S. Pat. No. 4,928,582. In Gona et al. U.S. Pat. No. 3,672,293 commonly adjusted parallel vanes are used for directionality control.

An object of the present invention is to provide an improved air discharge nozzle, and, especially a discharge nozzle, particularly useful for vehicle interiors. A specific object of the invention is to provide an air discharge nozzle and method for vehicles having a grill which has a high degree of visual opacity to enhance design aesthetics, low impedance so that the face velocity remains high, and which does not significantly affect directionality of the air as imparted to the air stream by an upstream control mechanism and which, preferably, can be molded. Another specific object of the invention is to provide an improved directionality control mechanism.

According to the invention, the grill is comprised of a monolayer of polygonal cells in an array of cells, each cell being bounded by planar walls having a depth "L" interstitial thickness "T" and a diameter or major dimension "D", wherein the interstitial depth L is short enough such that the planar walls do not act as vanes to significantly affect directionality of the air as imparted by the upstream directionality control mechanism, the interstitial thickness T has a value such that the impedance to air flow is low and the ratio of T/D is such that there is low friction losses at the grill and the length to diameter ratio L/D is no greater than about 0.7 and no less than about 0.3, such that the relative visual opacity of the grill when viewed from any angle is high. In order to accommodate modern molding practices, in the preferred embodiment, the depth L is no greater than about 5 times the interstitial thickness T. In the preferred embodiment, the open cell area Ao must be at least about 76% of the available (total) area to obtain an acceptable 1800 ft/min face velocity at a blower pressure of 0.24 inches $H_2O$. As defined herein, visual opacity ranges from 0 percent for an open nozzle (e.g. no grill) to where the grill is in place 24 percent is obscured when the observer is looking directly on the cells and the observer's viewing angle changes from an axial alignment with the cells and becomes more and more visually opaque to where, in the case of the L/D ratio of 0.67 or a 56 degree viewing angle equals 100 percent opacity.

The upstream directionality control mechanism includes, in a preferred embodiment, an open intruder frame having an upstream bounding edge joined to its downstream boundary edge by converging walls so that the cross-sectional area of the total shadow area of the frame projected on a plane normal to the axial center is essentially constant so that the impedance to air flow is essentially constant. A cross member joined to the frame member has an axially projecting control shaft which carries a spherical member frictionally received in a spherical socket formed in the grill such that the control shaft can easily be manually manipulated. When the end of the shaft projects beyond the grill in the form of a control knob, the knob points in the direction the air is caused to flow. Moreover, since the intruder is an open frame, the amount of angular movement of the control shaft is significantly reduced. In a further embodiment, the intruder member is a small area disk on the upstream end of the control shaft.

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1A:
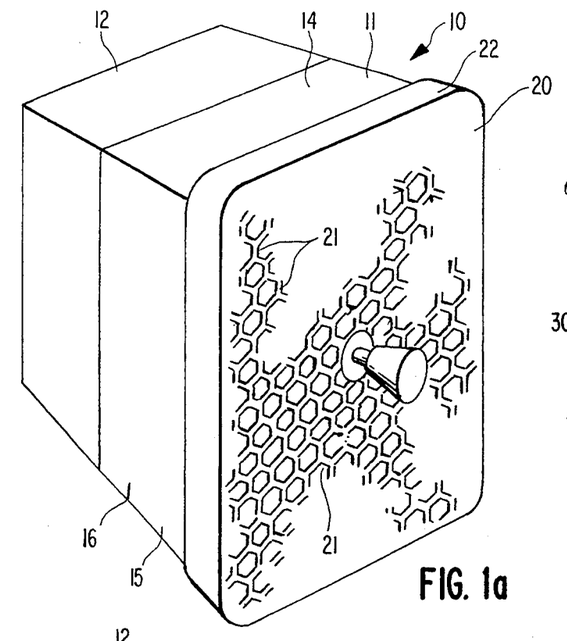
FIG. 1a is an isometric illustration of a vehicular air discharge nozzle incorporating the invention.
Figure 1B:
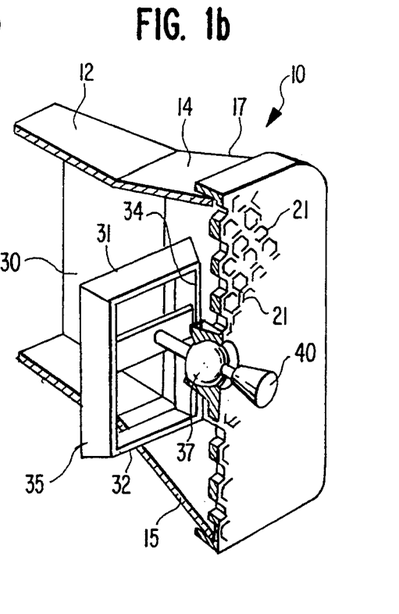
FIGS. 1b and 1c are similar views broken away to reveal the intruder.
Figure 1C:
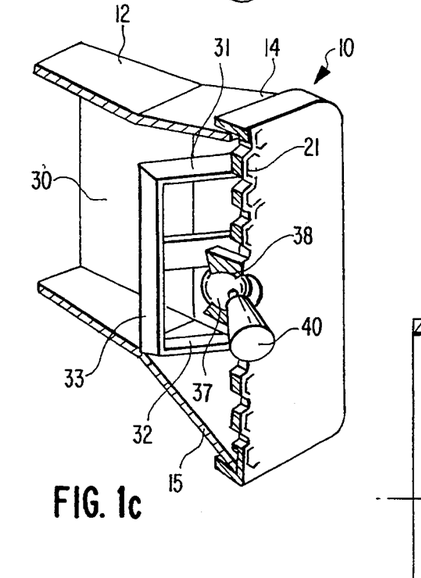
Figure 2:
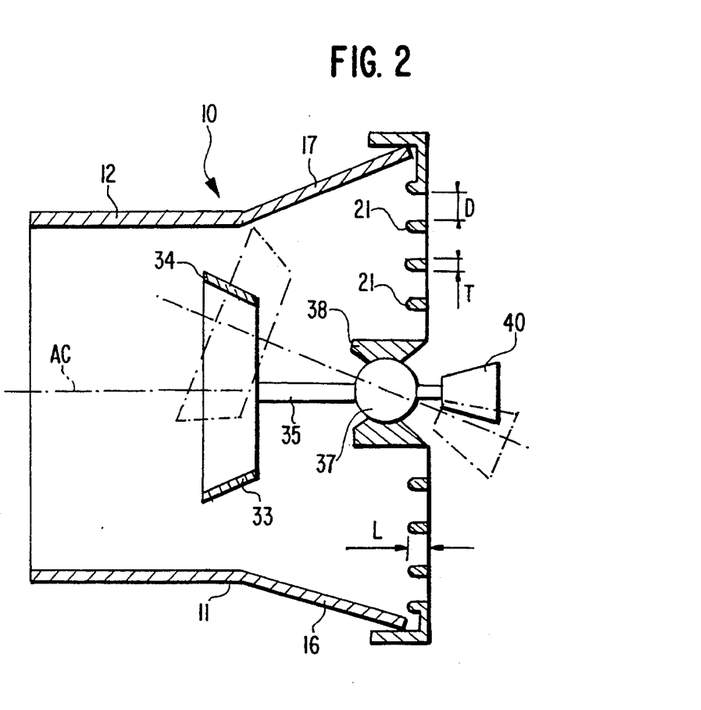
FIG. 2 is a sectional view of the air discharge nozzle shown in FIGS. 1a-c, FIGS. 3a, 3b, 3c, and 3d, are examples of grill cell patterns.

Referring to FIGS. 1 and 2 (which is a horizontal section through FIG. 1), a nozzle 10 incorporating the invention has an upstream end 11 coupled to an air supply duct 12. In this embodiment, the duct is rectangular, but it could be circular or oval in cross-section. Diverging top 14, bottom 15, sides 16 and 17 form the downstream outlet which is closed off by grill 20, which is formed of a monolayer of polygonal cells (hexagonal) in an array of cells bounded by planar walls 21 having a depth L, an interstitial thickness T, and a major diameter D. The grill 20 is mounted to close off the downstream outlet end by an annular rim 22, but could be part of a larger molding having other functional attributes with the downstream outlet end secured by fasteners or adhesive, etc. (not shown).

In the preferred embodiment, directionality of air flow is controlled by open frame intruder member 30, which in the embodiment illustrated, is rectangular, having top and bottom intruder members 31 and 32 and side intruder members 33 and 34 to form an endless open frame. Intruder members 31, 32, 33 and 34 converge slightly from their upstream edges to their downstream edges so that, within limits, regardless of the angular orientation of the open frame of intruder 30 to the axial center AC, its cross-sectional area projected on a plane normal to the axial center AC, is essentially constant to where one of the members 31 or 32 and one of members 33 or 34 is parallel to the axial center (see the phantom position in FIG. 2). As one member projects a larger area on the plane, the other member casts or projects a correspondingly smaller area, thereby maintaining the impedance essentially constant.

Moreover, since each intruder member is spaced from the axial center when the open frame intruder is centered (and not causing any air deflection, the amount of movement of the control shaft 35 is significantly less than the case where a single intruder member is swinging from one boundary wall to the other). However, the benefits of the grill features discussed earlier herein are just as applicable to single intruder members as to the open frame intruder member.

A cross member 36 secures the upstream intruder 30 to the upstream end of control shaft 35. A spherical ball 37 on shaft 35 is received in split spherical socket 38 which is formed, preferably, in the axial center of grill 20, and a manual control knob 40 is formed on the end of shaft 35. The members 31, 32, 33, 34 of the intruder 30 operate in conjunction with a respective side of the nozzle which it is directed to approaches to direct the air flow to the opposite side, as shown in phantom or dashed lines in FIG. 2, which corresponds with the direction of deflection of the intruder 20 shown in FIG. 1c. In FIGS. 1a and 1c, the intruder is axially centered so there is no deflection. This construction provides for up, down, left and right deflections as well as those in between. Instead of knob 40 or spherical surface with a bump to indicate the axial center, and manipulated by a thumb or index finger.

The effect of the novel grill cell design and geometry on visual opacity as well as its effect on performance parameters of face velocity and deflectability of the air stream will be described in relation to the graphs of FIGS. 4, 5 and 6. The effect of the interstitial wall thickness on the face velocity and is expressed in the graph of FIG. 4 as related to the percent of open cell area. The reason % open was chosen is because the proper thickness is also dependent on cell shape size.

Figure 4:
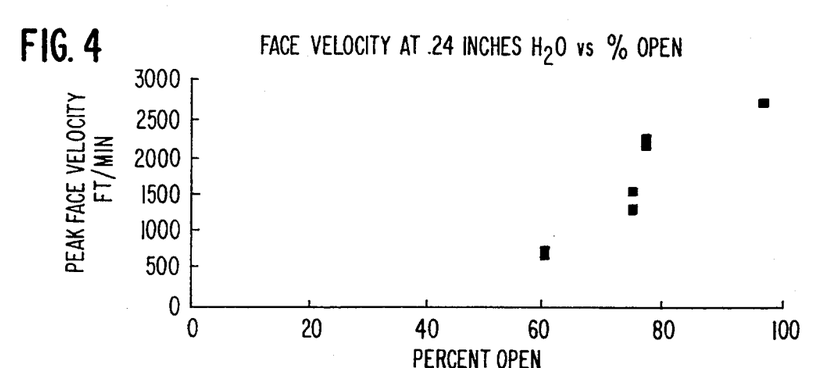
FIG. 4 is a graph showing the result of tests of percent open cell area versus peak face velocity in feet per minute.

An acceptable face velocity is in the order of 1800 ft/min which corresponds to an open cell area of about 76% in the graph of FIG. 4.

The next parameter to consider is the effect of cell L/D on the ability to deflect the stream. That is, the cell should be thin enough in depth to not redirect the deflected airstream. The test results are shown in FIG. 5 where the ratio of the deflection angle with grill to the deflection angle without grill is plotted against the cell depth/diameter (L/D).

Figure 5:
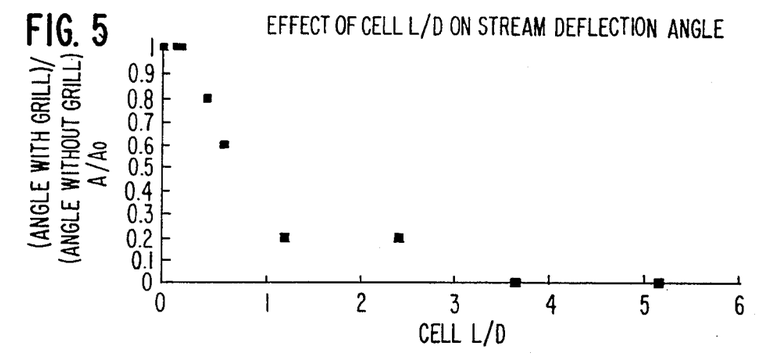
FIG. 5 shows the effect of the cell L/D ratio on the ability to deflect the air stream and is a graph of the ratio of the deflection angle with grill to the deflection without grill plotted against the cell depth/diameter (L/D) ratio.

As can be seen in the graph of FIG. 5, a L/D ratio up to 0.6 may be used to obtain an acceptable deflection angle. If the cell is deeper, i.e., L/D>0.6, then the deflection is impaired by the grill.

Figure 6:
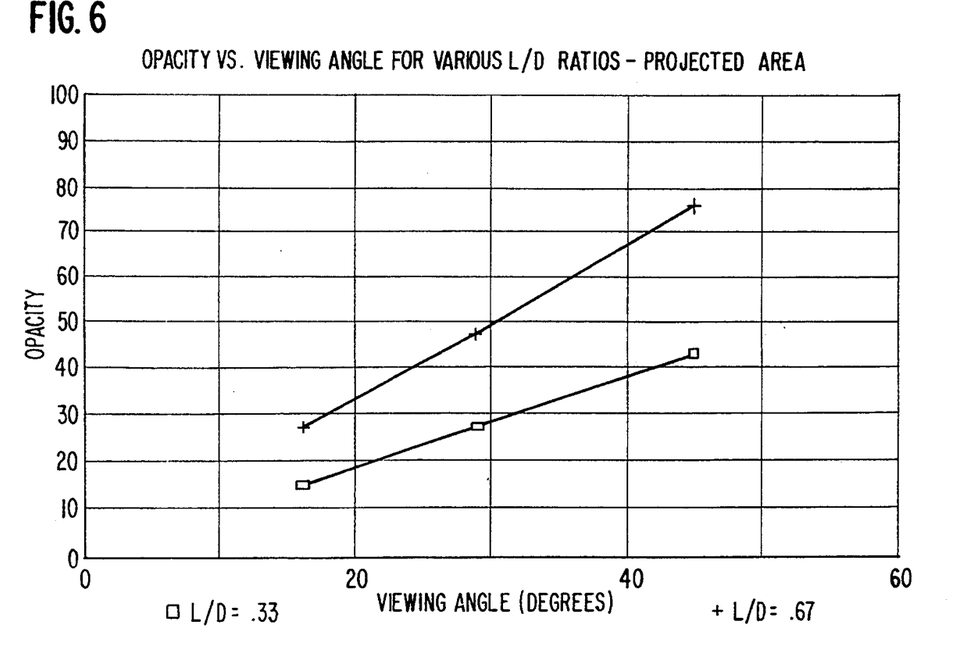
FIG. 6 is a plot of relative opacity vs. viewing angle for various L/D ratios.

Finally, the opacity of the grill was analyzed where the percent of the available cell area which is opaque is plotted vs. the viewing angle (from the perpendicular to the face of the grill) in FIG. 6. In reviewing FIG. 6, it must be remembered that the current grills are very transparent in that large areas behind the grill can be seen at even large angles; up to 70 degrees.

CELL GEOMETRY FOR PROPER FACE VELOCITY

According to the invention, the open cell area Ao is preferably at least about 76% of the available (total) area to obtain an acceptable 1800 ft/min face velocity at blower pressure of 0.24 inches H2O. Mathematically stated this is:

$$\frac{Ao}{Ao + Ai} \geq 0.76$$

$$\frac{1}{1 + \frac{Ai}{Ao}} \geq 0.76 \text{ or } \frac{Ai}{Ao} \leq 0.316$$

The cell geometry in terms of t/D, changes for each cell shape, i.e.

$$\frac{Ai}{Ao} = K\frac{t}{D}$$

where t=interstitial thickness D=cell "diameter"

| CELL SHAPE | K | t/D max for 76% open area | L/T (FOR MOLDING) |
|---|---|---|---|
| square | 2.0 | .158 | 3.8 |
| hexagon | 2.3 | .137 | 1.4 |

| CELL SHAPE | K | t/D max for 76% open area | L/T (FOR MOLDING) |
|---|---|---|---|
| triangle | 3.5 | .090 | 6.7 |

Figures 3A, 3B, 3C, 3D:
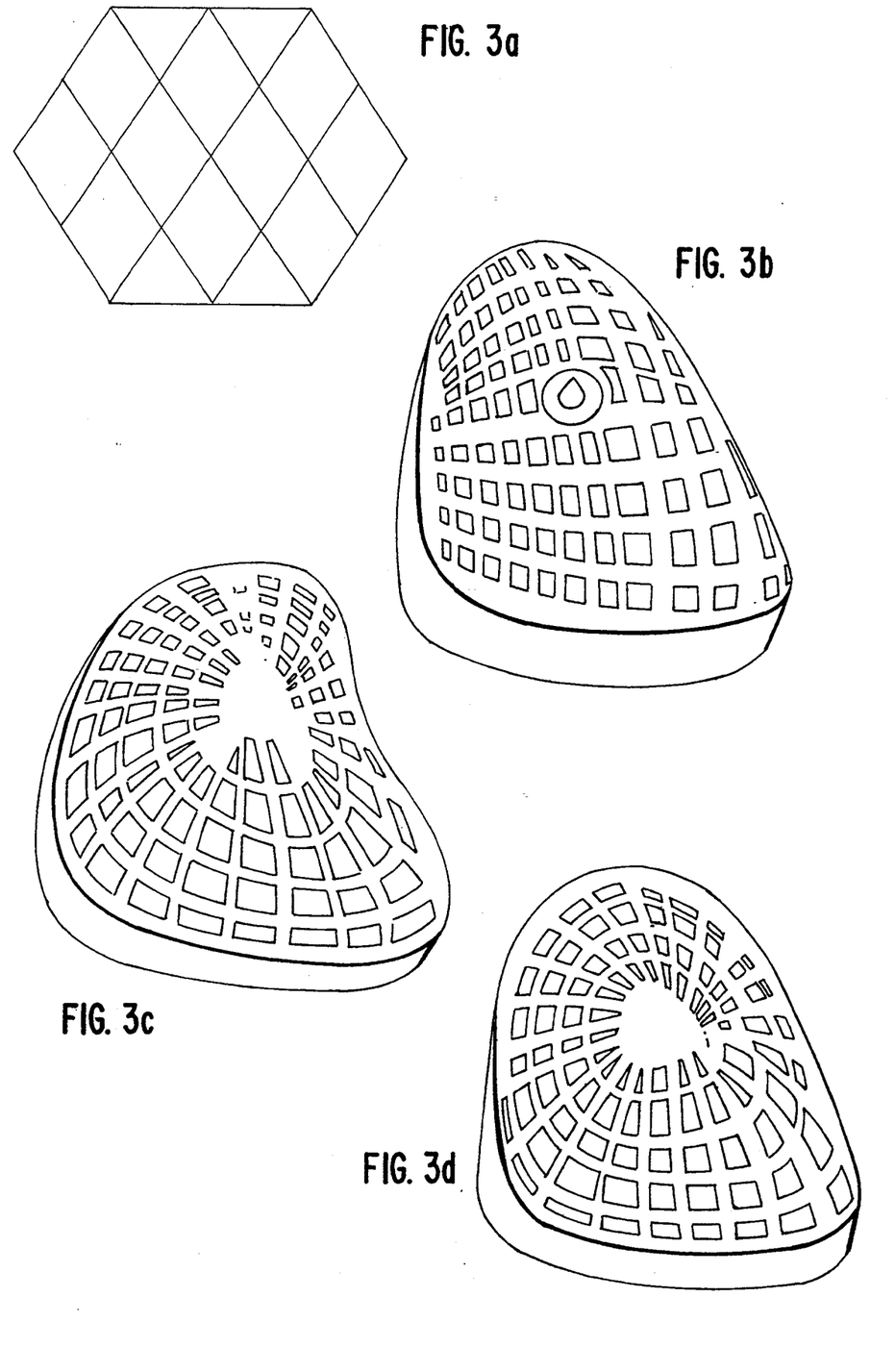

Various cell geometries are shown in FIGS. 3a-3b. FIG. 3a shows a cell array wherein the cells are diamond-shaped and the major diameter is the largest diameter; in FIG. 3b. FIGS. 3b-3d show various forms of essentially square cell patterns where the major diameter D is an average of cell diameters. While a triangular cell pattern could be used, this is a less preferred embodiment of the invention.

Figure 7:
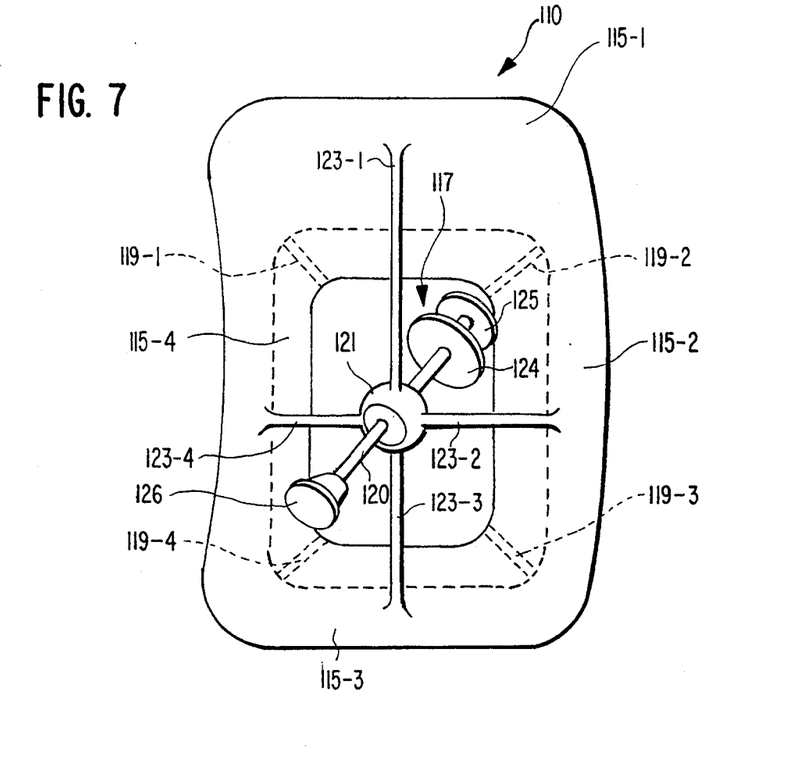
FIG. 7 is an isometric view of a further embodiment of an air flow outlet incorporating the invention.

In the embodiment shown in FIG. 7, instead of an open frame intruder member, the invention uses a disc. The air flow outlet has an inlet opening or nozzle with a central axial axis joined to a larger area outlet opening by a cusp region and diverging short walls. According to this embodiment, the upstream intruder deflector member is a small disc or plate which, like the frame intruder shown in FIGS. 1b, 1c and 2, has a surface area which is a small fraction of the surface area of the inlet opening. The disc has an axial center which, when aligned with the axial center of the inlet opening, causes air flow substantially uniformly around all sides of the intruder or barrier member, but when the axial center of the intruder or barrier member is offset from the axial center of the intruder or barrier member, air flows on the opposite side from the direction of offset and, in conjunction with cusp region and the diverging sidewalls on that opposite side, causes the air to flow in a deflected direction which is at an angle to an axis passing through the axial center of the inlet and outlet opening. The cusp or space region bounds the perimeter of the inlet opening or nozzle and when the intruder member is axially aligned, normal wall attachment effects are minimized by the cusp region and an offset.

The intruder is on a shaft which is mounted by a universal joint in the axial center of the outlet opening such that the direction of orientation of the shaft points substantially in the direction of air flow. However, the intruder member could be mounted on a planar frame which is translatable in its plane by an adjustment mechanism to adjust the position of the intruder relative to the central axis of the inlet opening. The disc intruder member can be used in place of the preferred frame intruder member grille shown in the earlier embodiments.

Figure 8:
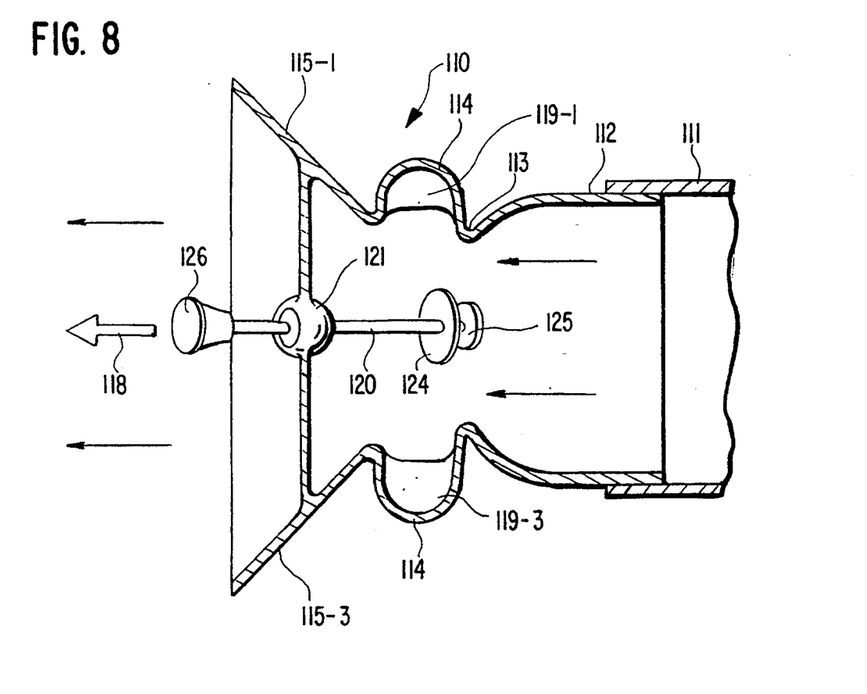
FIG. 8 is a diagrammatic sectional view of the embodiment shown in FIG. 7 showing the intruder member centrally and coaxially located to direct the main air flow vector directly outwardly.
Figure 9:
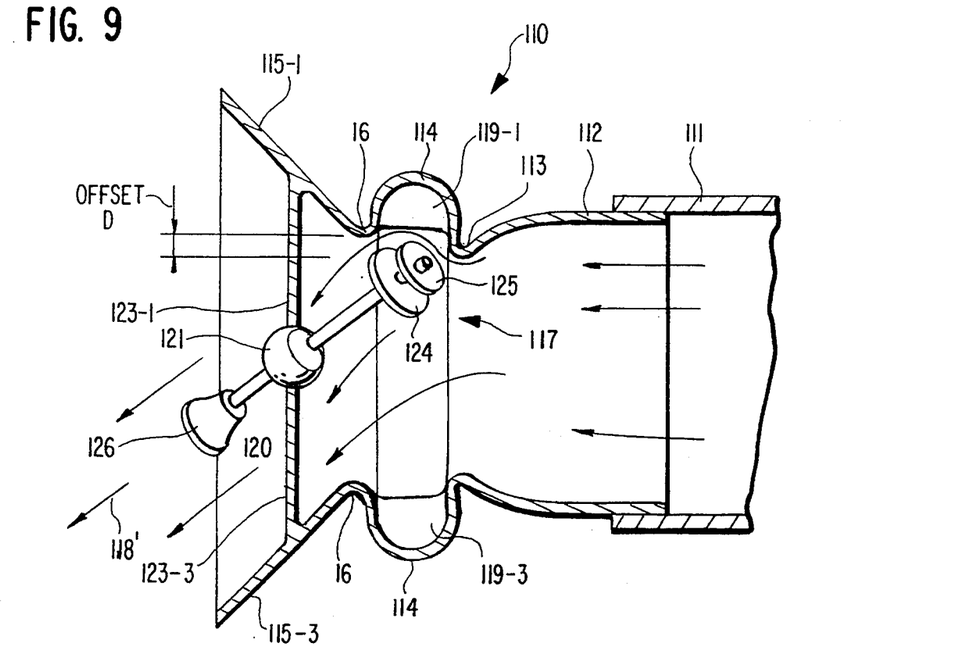
FIG. 9 is a diagrammatic sectional view of the embodiment of FIG. 7 showing the intruder member which has been positioned offset from the axial center so that the main air flow vector is directed at an angle to an axis line through the axial center.
Figure 10:
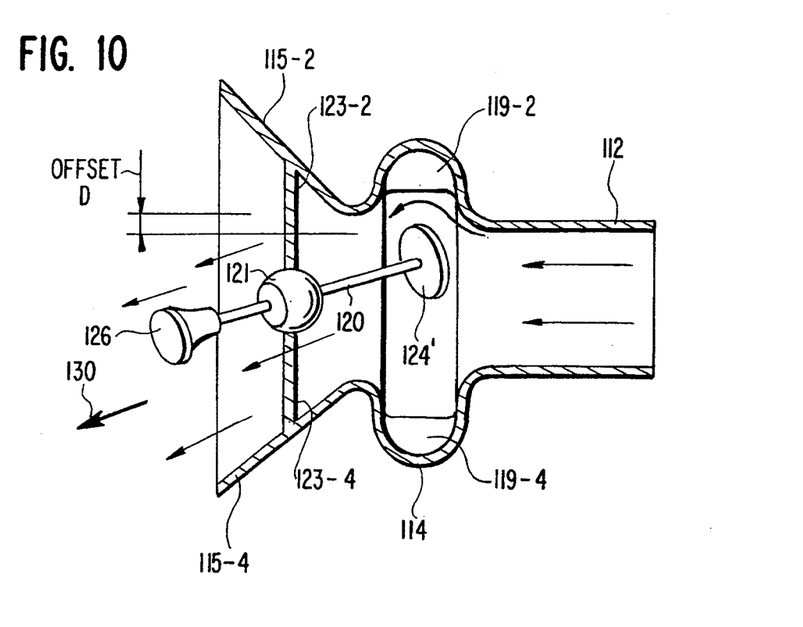
FIG. 10 is a diagrammatic sectional view of a modification of the outlet shown in FIG. 7 with a further modification of the intruder member.

Referring to FIGS. 7-9, an air flow outlet 110 incorporating the invention is attached to a duct 111, which is connected to a supply of air under pressure, such as a vehicle air heater and air conditioner supply. The input portion 112 converges to a nozzle 113 which, as shown in FIG. 7 is slightly rectangular, but could be square, circular or oval in shape. A cusp forming portion or region 114 is connected between nozzle 113 and short diverging walls 115-1, 115-2, 115-3 and 115-4 which have upstream ends 16 which are offset a distance D from the nozzle 113. The offset, cusp region, short length of the walls 115 and the angle of wall divergence (about 45 degrees in this embodiment) are sufficient to preclude any significant wall attachment effects to walls 115-1, 115-2, 115-3 and 115-4 when the control intruder disc 117 is centrally positioned and axially aligned as shown in FIG. 8 so that air has a main flow vector 118, which is axially aligned with the axis of the input portion 112.

Cusp 114 optionally may include baffle members 119-1, 119-2, 119-3 and 119-4 so as to substantially preclude circumferential flow of air and improve performance.

Control intruder member 117 is mounted on control shaft 120 which has a mounting ball 121 supported from a spherical socket 122, which, in turn is supported by spider legs 123-1, 123-2, 123-3 and 123-4, whose respective ends are secured to or formed with diverging walls 15-1, 115-2, 115-3 and 115-4, respectively.

In FIGS. 7-9 intruder disc member 117 is constituted by a pair of intruder plates 124, 125, plate 125 being smaller in diameter than plate 124 so as to present a stepped intruder member to air flow when in the position shown in FIG. 8. The intruder member has a small area (in its largest dimension plate) relative to the area of the inlet nozzle 13 (5 to 30% are preferable ratios, but other ratios may be found useful). Although circular intruder members are shown, it will be appreciated that oval and rectangular intruder plates may be used if desired.

Optionally, a knob 125 on the end of control shaft 120 may be provided, but for some aesthetic circumstances, it may be desirable to avoid any projections beyond the ends of the diverging walls 115-1, 115-2, 115-3 and 115-4 so the control will be merely adjusting sphere 121 in spherical socket 122 (in the fashion of a computer trackball). Moreover, the intruder member could be a plate having a perimetrical shape corresponding to the shape of outlet nozzle 113 held by a spider frame and translatable in its plane by a gear or linkage adjustment mechanism and the control shaft and spherical ball mount eliminated.

In operation, when the axis of the intruder plate is axially aligned with the axis of the nozzle 113, there is substantially no wall attachment effects (short walls, large divergence angle and cusped offset) so air flows straight out of the outlet as indicated by arrow 118 in FIG. 8. When the intruder plate assembly 117 is deflected toward one side, air is directed toward the opposite side and at the same anytime air which flows around the opposite side and is redirected by the cusp. These effects augment each other and in conjunction with wall effects adjacent the short diverging wall toward which the air flow has been deflected by the intruder member and the cusp and has a main flow vector indicated by arrow 118'.

In the embodiment shown in FIG. 9, the stacked plate intruder member has been replaced by a single plate 24' and the main air flow vector 130 is illustrated as being partially deflected toward short wall 115-4.

Figure 11:
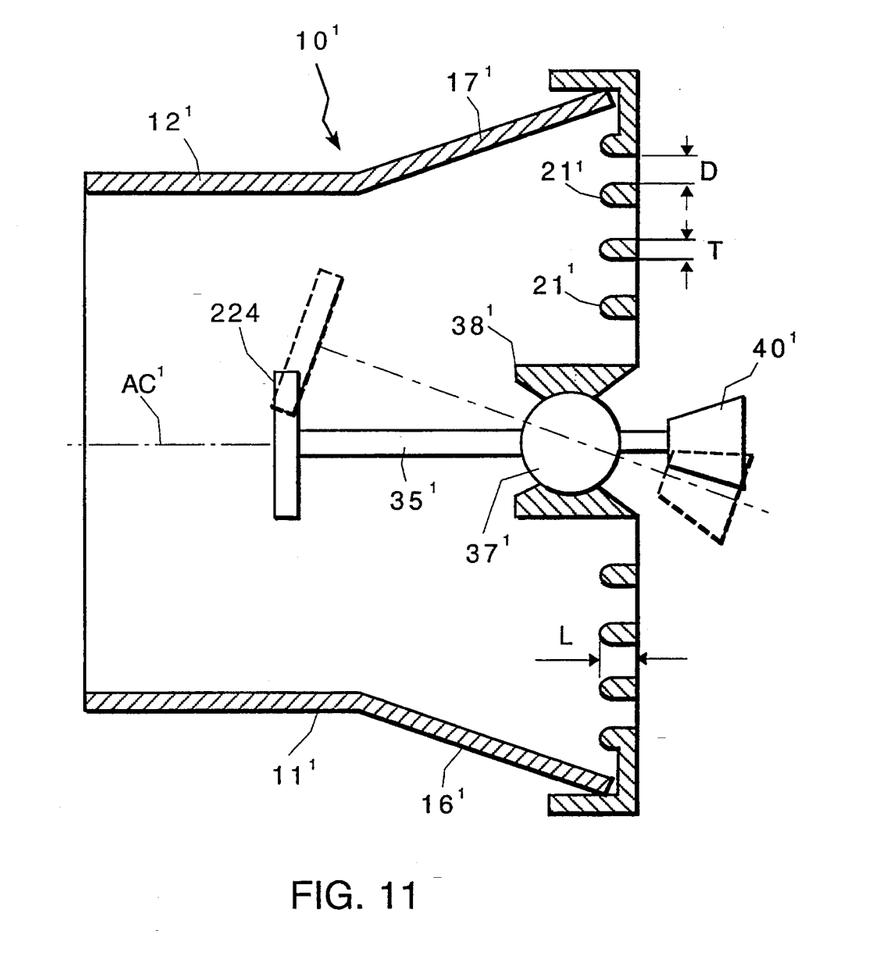
FIG. 11 is a view similar to FIG. 2 showing the use of the disc intruder member with the novel grill structure disclosed herein.

The embodiment in FIG. 11 shows an air outlet nozzle 10' with a grill structure 21' as described earlier herein and an upstream deflection system comprised of a disc intruder 224 on the upstream end of control shaft 35'. Disc intruder 224 has an area which is substantially less than 50% of the duct opening, and preferably in the range of 5% to about 30% of the open area of said duct.

While a preferred embodiment of the invention has been shown and described, and several further embodiments illustrated, it will be appreciated that various other embodiments and modifications will be apparent to those skilled in the art.

What is claimed is:

1. In a nozzle for discharging air to ambient and having an axial center and upstream and downstream ends, upstream end means for directing air in different directions relative to said axial center and a grill at the downstream end of said nozzle, the improvements comprising, said upstream end means including an intruder disc member and a downstream extending control shaft for positioning said disc member and a ball joint in said grill mounting said proximate the center thereof, said grill being comprised of a monolayer of polygonal cells in an array of cells bounded by planar walls having a depth L, interstitial thickness T, and said cells having a major diameter D, and wherein:

L is short enough such that said planar walls do not significantly affect directionality of the air as imparted by said upstream means for directing, and T has a value such that the impedance to air flow is very low, the length L to diameter D ratio (L/D) is no greater than about 0.7 and no less than about 0.3, such that the degree of opacity of said grill is relatively high.

2. The nozzle defined in claim 1 wherein said cells are hexagonally-shaped and the ratio of T/D is such that:

$$\frac{Ao}{Ao + Ai} \geq 0.76$$

where

Ao is the open cell area and Ai is the interstitial area.

3. The nozzle defined in claim 1 wherein said grill is a molded plastic and L is no greater than 5 T.

4. The nozzle defined in claim 1 wherein said planar walls are substantially parallel.

5. The nozzle defined in claim 4 wherein said nozzle has a curved surface facing said ambient.

6. The nozzle defined in claim 1 wherein the ball joint includes a spherical ball on said control shaft, and a spherical socket centrally formed in said grill for receiving and retaining said spherical ball, said spherical socket being adapted to permit movement of said shaft such that said intruder disc can be positioned coaxially aligned with said axial center and in an arcuate path in said upstream end to act in conjunction with said upstream end to direct air through said grill in an opposite direction, respectively.

7. In a nozzle for discharging air to ambient and having an air inlet and an axial center and upstream and downstream ends, upstream end intruder means for causing the deflection of air in different directions relative to said axial center, said upstream end having an input with bounding walls and an area A1, the improvement in said upstream end intruder means wherein said intruder member is an intruder disc having an area A2 projected on a plane transverse to said axial center which is substantially less than 50% of said area A1, a control shaft secured at one end to said intruder disc and having means for rotatably mounting said shaft in coaxial alignment with said axial center, said control shaft being adapted to position said intruder disc at different positions relative to the sidewalls of said air inlet.

8. A nozzle as defined in claim 7 including a grill at the downstream end of said nozzle, said grill being comprised of a monolayer of cells in an array of cells bounded by planar walls having a depth L, interstitial thickness T, and diameter D, and wherein:

L is short enough such that said planar walls do not significantly affect directionality of the air as imparted by said upstream means for directing, and T has a value such that the impedance to air flow is very low, the length L to diameter D ratio (L/D) is no greater than 0.6 and no less than 0.3, such that the relative opacity of said grill when viewed from any angle is high.

9. The nozzle defined in claim 8 wherein said cells are hexagonally-shaped and the ratio of T/D is such that:

$$\frac{Ao}{Ao + Ai} \geq 0.76$$

where

Ao is the open cell area and Ai is the interstitial area.

10. The nozzle defined in claim 8 wherein said grill is a molded plastic and L is no greater than 4 T.

11. An air flow outlet comprising a member having an inlet opening, diverging walls, means joining said inlet opening to said diverging walls, said inlet opening having an area A1 and first axial center, an intruder member having an axis alignable with said first axial center, said intruder member having a maximum area A2 to air flow when said axis and axial center are in alignment, which is a predetermined small fraction of the area A1 of said inlet opening, said small fraction being from about 5 percent to about 30 percent of said area A1, and having a second axial center, and control shaft means secured to said intruder member for adjusting said intruder member from where said second axial center is aligned with said first axial center and air flow around the edges of said intruder member and said air flow has a flow vector which is aligned with said first axial center to where said second axial center is offset from said first axial center and air flows around an opposite side of said intruder member from the direction of said offset and toward said diverging wall means and said air flow has a flow vector which is at an angle to an axis line through said first axial center and aligned with said shaft.

12. The air flow outlet defined in claim 11 wherein said means joining said diverging walls to said inlet opening is a cusp surrounding said inlet.

13. The air flow outlet defined in claim 11 wherein said diverging sidewalls diverge at an angle, and are of a length, such that there is no significant wall attachment effects when said intruder member is centrally positioned and said first and second axial centers are substantially axially aligned.

14. The air flow outlet defined in claim 11 wherein said intruder member is a plate and said cusp means includes one or more baffle members.

15. The air flow outlet defined in claim 11 wherein said intruder member is stepped and said area A2 is the largest area portion of said stepped intruder.

16. The air flow outlet defined in claim 11 including a spherical socket and means mounting said spherical socket along said first axial center of said outlet and a mounting ball in said spherical socket and means securing said shaft means to said mounting ball.

17. The air flow outlet defined in claim 11 wherein said intruder member is an open rectangular frame.

18. The air flow outlet defined in claim 11 including an outlet grill at the downstream end of said outlet, said grill being comprised of a monolayer of polygonal cells in an array of cells bounded by planar walls having a depth L, interstitial thickness T, said cells having a major diameter D, and wherein:

L is short enough such that said planar walls do not significantly affect directionality of the air as imparted by said upstream means for directing, and T has a value such that the impedance to air flow is very low, the length L to diameter D ratio (L/D)

is no greater than about 0.7 and no less than about 0.3, such that the degree of opacity of said grill is relatively high.

19. The nozzle defined in claim 18 wherein said cells are hexagonally-shaped and the ratio of T/D is such that:

$$\frac{Ao}{Ao + Ai} \geq 0.76$$

where
Ao is the open cell area and Ai is the interstitial area.

20. The nozzle defined in claim 18 wherein said grill is molded plastic and L is no greater than 5 T.

21. The nozzle defined in claim 18 wherein said planar walls are substantially parallel.

* * * * *